UNITED STATES PATENT OFFICE.

FRANÇOIS A. H. LA RUE, OF QUEBEC, CANADA.

IMPROVEMENT IN PROCESSES OF CONCENTRATING COPPER PYRITES.

Specification forming part of Letters Patent No. 156,093, dated October 20, 1874; application filed May 9, 1874.

*To all whom it may concern:*

Be it known that I, FRANÇOIS A. H. LA RUE, of Quebec, in the province of Quebec and Dominion of Canada, have invented a new and useful Improvement in Process of Concentrating Copper Pyrites, of which the following is a specification:

Copper pyrites is found combined with variable proportions of sulphurets of copper, and iron, and quartz, shales, silicious and other earthy matters; and my invention consists in a process by which the copper and iron ores, intimately combined, are separated from the quartz, shales, and other earthy and extraneous matters.

My object is to utilize, for smelting or other purposes, the copper pyrites now deemed too poor for such purposes.

By separating the pyrites from this mass of foreign matter the weight and bulk are greatly reduced, and transportation is consequently lessened. This separation and concentration are effected by first rendering the iron, which is combined with the copper in the pyrites, magnetic, and then separating the magnetic material, composed of iron and copper, from the non-magnetic, by passing the mixture through a magnetic or an electro-magnetic apparatus.

The different steps followed in this process are as follows: First, the copper pyrites, previously pulverized, is roasted by any of the known methods, but in some instances the roasting may be dispensed with. Second, the ore is mingled with a small quantity of pulverized carbon, as common coal, either mineral or charcoal, or other carbonaceous or reducing agent, solid, liquid, or gaseous. Third, the mixture is then introduced into suitable vessels or retorts, closed or partially closed, or into furnaces of suitable construction, and subjected to the action of heat for a certain period of time, according to the quantity of ore operated upon and the temperature employed, which last must be intense enough to insure at least a partial reduction of the iron ore, which then becomes magnetic and remains combined with the copper ore. Fourth, after such treatment the whole mixture is thrown upon a magnetic or electro-magnetic apparatus, through which it is passed. In this manner the magnetic material, composed of the copper and iron ores, is separated from the earthy and other foreign material. In this condition the ores are so concentrated as to greatly lessen the cost of transportation, and allow them to be smelted the same as other ores, thus utilizing for valuable purposes the hitherto valueless pyrites.

Having thus described my invention, I claim as new and desire to secure by Letters Patent—

The process of eliminating impurities from and preparing copper pyrites for convenient transportation, by partially reducing the previously roasted and carbonized ore with heat until it becomes magnetic, and then passing the product through an electro-magnetic machine, whereby the copper and iron ore are separated from the earthy or other matter.

F. A. H. LA RUE.

Witnesses:
    B. VERRET,
    ALFRED PAVE.